United States Patent [19]

Croyle

[11] 4,207,997
[45] Jun. 17, 1980

[54] HANDLED CARRIER FOR CONTAINERS

[75] Inventor: Jack V. Croyle, Woonsocket, R.I.

[73] Assignee: Dart Industries Inc., Los Angeles, Calif.

[21] Appl. No.: 827,646

[22] Filed: Aug. 25, 1977

[51] Int. Cl.² ................................................ B65D 71/00
[52] U.S. Cl. ..................................... 224/55; 220/94 R; 294/31.2
[58] Field of Search ............... 224/55, 49, 52, 45 C, 224/45 F, 45 P; 294/31.2; 206/476; 215/100 A; 220/94 R, 94 A, 96; 150/12; 16/110.5, 114 R; 229/54; 24/3 F

[56] References Cited

U.S. PATENT DOCUMENTS

| | | | |
|---|---|---|---|
| 2,371,639 | 3/1945 | Mason | 16/125 |
| 2,800,940 | 7/1957 | Riesebeck | 224/55 |
| 2,991,376 | 7/1961 | Sherwood et al. | 220/94 R |
| 3,220,626 | 11/1965 | Tupper | 224/55 |
| 3,311,252 | 3/1967 | Swartwood et al. | 294/31.2 |
| 3,463,536 | 8/1969 | Updegraff et al. | 294/31.2 |
| 3,589,764 | 6/1971 | Cunningham | 294/31.2 |
| 3,665,551 | 5/1972 | Ender | 150/12 |
| 3,692,218 | 9/1972 | Friedman | 150/12 |
| 4,068,779 | 1/1978 | Canfield | 220/94 R |

*Primary Examiner*—Kenneth W. Noland
*Attorney, Agent, or Firm*—Leigh B. Taylor

[57] ABSTRACT

A handle member and a complementary handle member are transversly affixed to respective free ends of a pair of opposed straps extending from an endless member which can embrace a container. The handle member includes an edge and a lip which are detachably engageable with a lip and an edge, respectively, carried by the complementary handle member to form a handle structure. The handle member and the complementary handle member are retained in engagement in response to resilient deformation of the straps.

12 Claims, 12 Drawing Figures

U.S. Patent  Jun. 17, 1980  Sheet 1 of 2  4,207,997
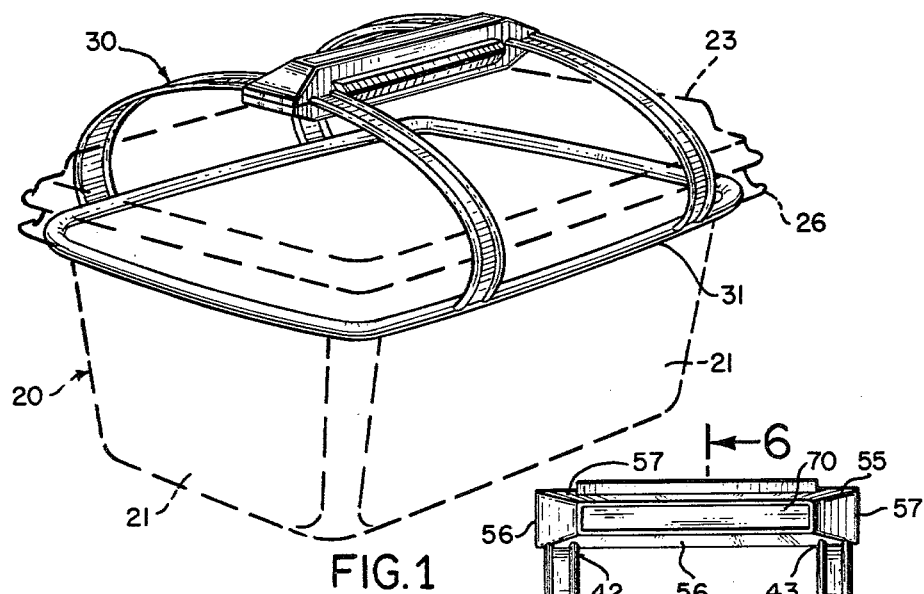
FIG.1
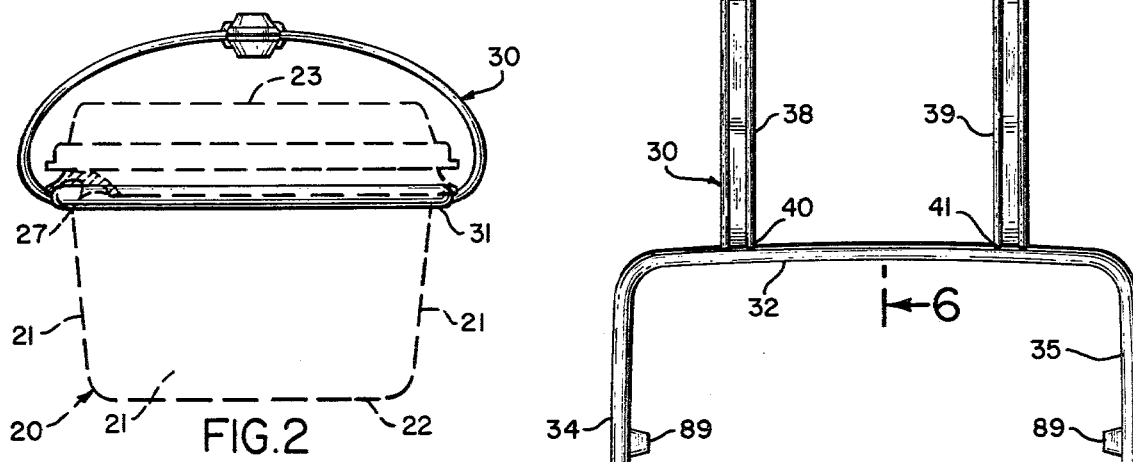
FIG.2
FIG.3
FIG.4

HANDLED CARRIER FOR CONTAINERS

This invention relates to carrying or toting apparatus.

More particularly, the present invention relates to devices for lifting and carrying personal sized objects.

In a further aspect, the instant invention concerns a handled carried which is detachably engageable with a container or other geometric solid.

The prior art is replete with devices which facilitate the manual lifting and carrying of personal sized articles, such as open containers, closed boxes and similar geometric solids. The devices usually include a hand grip section born by a support element which is affixed to the article. Support elements, which are either rigid or flexible, are attached to articles by various rigid, moveable or detachable connection schemes.

Exemplary of a permanently affixed lifting and carrying means is the handle structure rigidly cantilevered from the side of a common domestic cooking utensil. Moveable handle structures are illustrated by the commonplace scrub-bucket or milk pail. The ends of the supporting element, usually a relatively thin, rigid wire member, are pivotally connected to the container element at diametrically opposed positions. For the comfort of the user, a hand grip is located near the middle of the wire.

Detachable lifting and carrying means, which may be more generally classified as carriers, are also familiar. One common type of detachable carrier provided by the prior art utilizes an endless member as the support element. The endless member engages the container and is restrained from upward movement either by the divergent side walls of the container or some type of abutment means. A flexible member extends over the top of the container and is attached at the ends thereof to the endless member. Rigid endless members and rigid clamp type members are also used to support a hand grip extending from one side of the container. The prior art has also devised a carrier having a pair of bails which encircle the container in spaced vertical relationship. A strap or other hand grip element extends between the bales.

The advantages of a detachable carrier over a permanently attached lifting and carrier device are many and obvious. A detachable carrier is usable with sequential containers or other articles. A flexible endless member can accomodate geometric solids that are variously shaped within predetermined limits. The removeability of the carrier facilitates storage of the container since surface irregularities and overall dimensions are reduced.

Detachable carriers however, are not without certain inherent limitations. While adequately providing for the lifting and carrying of the container, the carrier frequently interferes with proper access to the container and accordingly must be removed and replaced as access to the container is desired. This condition is particularly accelerated for containers or boxes provided with lids or other closure members. Also, the common relatively thin band-like handles are a source of laceration or other injury or discomfort to the hands, especially when a relatively heavy load is placed within the container.

Carriers do not generally provide adequate stability. This is especially true when considering a flat bottom container carrying a solid load of non-uniform density or a load which can shift positions within the container.

Further, prior art carriers are not satisfactorilly compatible with certain types of containers, such as those molded or formed of resilient and yieldable plastic and having common domestic application for the preparation, storage and transportation of foodstuffs. The relatively rigid support members create distortion and strain in the naturally yeildable walls of the container. Relatively thin support members have the exceedingly deluterious effect of cracking or cutting the walls.

It would be highly advantageous, therefore, to rectify the problems associated with prior art carriers.

Accordingly, it is an object of the present invention to provide an improved carrier for lifting and transporting containers, boxes and other geometric solid articles.

Another object of the invention is the provision of a carrier which is readily and conveniently attached to or removed from a selected article.

Another object of the invention is to provide a detachable carrier which will provide unobstructed access to the container.

Still another object of this invention is the provision of a carrier which is useable with open top containers and with containers having lids or covers.

Yet another object of the invention is to provide a carrier having a hand grip section which is considerate of the hand of the user.

Yet still another object of the invention is the provision of a carrier which is readily fabricated to accomodate containers of selected differential shapes and sizes.

A further object of the instant invention is to provide a carrier which is especially adapted for use with plastic or other deformable or yieldable articles.

And, a further object of the invention is the provision of a carrier having stabilizing features for the transportation of unbalanced loads.

Yet a further object of the invention is to provide a carrier which is sufficiently compact to not materially increase the physical dimensions of the associated article.

And a further object of the invention is the provision of a carrier of the above type which is durably constructed yet relatively inexpensively manufactured.

Briefly, to achieve the desired objectives of the present invention in accordance with a preferred embodiment thereof, first provided is an endless member sized and shaped to encircle the side wall of a container. First and second flexible strap means extend from opposed positions along the endless member. Connection means carried proximate the free end of the first flexible strap means is detachably engageable with connection receiving means carried proximate the free end of the second flexible strap means.

In accordance with a further embodiment, a substantially rigid elongate handle member is transversly affixed to the free end of the first strap means and has an edge extending therealong directed toward the first strap means. A substantially rigid elongate complementary handle member is transversly affixed to the free end of the second strap means and has a lip extending therealong which is detachably engageable with the previous mentioned edge. The complementary handle member also includes an edge which is detachably received within a lip carried by the handle member. The handle member and the complementary handle member are held in engagement to form a handle structure in response to resilient deformation of the strap means.

Further, each strap means may comprise a pair of elongate strap members. Each pair of strap members extend from spaced positions along the endless member and are affixed at respective ends to the handle member and the complementary handle member.

Further and more specific objects and advantages of the instant invention will readily occur to those skilled in the art from the following and detailed description thereof taken in conjunction with the drawings in which:

FIG. 1 is a perspective view of a carrier constructed in accordance with the teachings of the present invention as it would appear when engaged with a container, the container being shown in dashed outline;

FIG. 2 is an end elevation view of the illustration of FIG. 1;

FIG. 3 is a top plan view of the illustration of FIG. 1;

FIG. 4 is a plan view of the carrier shown in FIG. 1 as it would appear when in the unstressed position;

Figure 5:
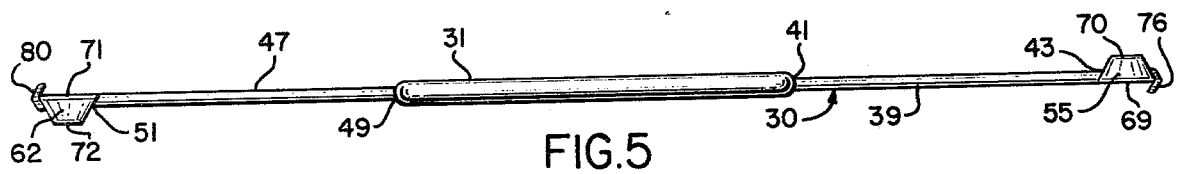
FIG. 5 is a side view of the carrier as shown in FIG. 4.

Turning now to the drawings in which the same reference characters indicate corresponding elements throughout the several views, attention is first directed to FIG. 1, which shows a container in broken outline and generally designated by the reference character 20. Container 20, as also seen in FIG. 2, includes side walls 21, bottom 22 and an open top not specifically seen in the illustrations. In accordance with typical construction, side walls 21 are substantially upright, being either vertical or somewhat divergent in either direction. It is also recognized that side walls 21 may be a continuous cylindrical structure. Closure member 23 extends over the open top and is engaged with the upper end of side walls 21 in accordance with various means well known to those skilled in the art. Peripheral flange 26 extends outwardly from container 20 and has an under surface 27.

A carrier generally designated by the reference character 30 and constructed in accordance with the teachings of the present invention is detachably combined with container 20 to form a tote kit. As specifically illustrated in FIGS. 1 and 2, carrier 30 is arranged for lifting and carrying container 20. The immediate and other arrangements of carrier 30 will become apparent as the description proceeds.

Referring more specifically to FIGS. 3 and 4, there is seen an endless member 31 which is sized and shaped to encircle container 20 below flange 26. In accordance with the immediate embodiment, endless member 31 is circular in cross section and includes four distinct sections, side runs 32 and 33 and transverse runs 34 and 35.

The several runs 32, 33, 34 and 35 define a generally rectangular parametric shape which is consistent with the shape of container 20. It is consistent with the scope of the invention that endless member 31 assume alternate shapes, such as circular, square or triangular, to accomodate variously shaped predetermined containers. Similarly various cross section configurations are contemplated. The circular cross section, as illustrated, is considered to be compatible with containers fabricated from plastic compositions or other materials which are susceptible to cutting, chipping or abrasion.

First flexible strap means is illustrated in the form of a pair of spaced apart parallel strap members 38 and 39 which extend from side run 32. First ends 40 and 41 of strap members 38 and 39, respectively, are affixed to first run 32 at spaced apart positions. Straps 38 and 39 terminate with free ends 42 and 43, respectively. Strap members 46 and 47 comprise a second flexible strap means. First ends 48 and 49 of strap members 46 and 47, respectively, are affixed to side run 33 at spaced apart positions. Strap members 46 and 47 extend from side run 33 in spaced apart substantially parallel arrangement and terminate with free ends 50 and 51 respectively.

It is noted that the first flexible strap means is opposed to the second flexible strap means. More specifically, first end 40 of strap member 38 is affixed to side run 32 at a point opposite the attachment of first end 48 of strap member 46 and similarly, first ends 41 and 49 of strap members 39 and 47, respectively, are attached at opposite positions to side run 32 and side run 33, respectively. The lateral geometric mid-point of endless member 31 and hence, the center of gravity of container 20 when empty or carrying a load of uniform density, is located along a line which substantially bisects the first and second flexible strap means. It is also noted that strap member 38 is in longitudinal alignment with strap member 46 and strap member 39 is in longitudinal alignment with strap member 47.

An elongate handle element 55 having longitudinal inboard side 56 directed toward strap members 38 and 39, substantially parallel longitudinal outboard side 57 and first and second ends 58 and 59 respectively, extends transverse of straps 38 and 39. Free ends 42 and 43 are affixed at spaced locations along inboard side 56. An elongate complementary handle element 62 is transversly carried by strap members 46 and 47. Complementary handle element 62 includes a longitudinal inboard side 63 directed towards strap members 46 and 47, a parallel longitudinal outboard side 64 and first and second ends 65 and 66.

Figure 6:
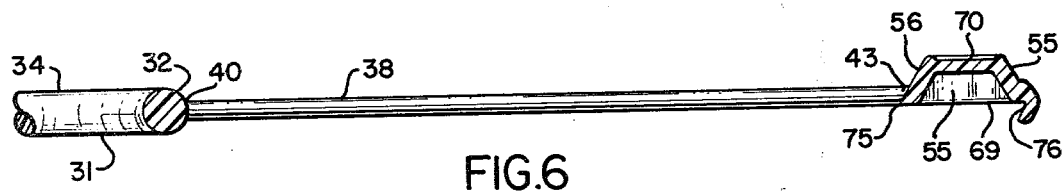
FIG. 6 is a partial vertical sectional view taken along the line 6—6 of FIG. 4.

As graphically illustrated in FIGS. 5 and 6, carrier 30 generally lies in a single plane when in an unstressed condition. Handle element 55 and complementary handle element 62 are identical structures and are attached to the respective flexible strap means in reverse arrangement.

Handle element 55 has a bottom surface 69 and a top surface 70. Complementary handle element 62 includes top surface 71 and bottom surface 72. The terms "top" and "bottom" are oriented relative the free state of carrier 30 as specifically seen in FIG. 5. When the strap means are stressed for engagement, as will be described presently, handle element 55 and complementary handle element 62 assume a reverse position.

Figure 8:
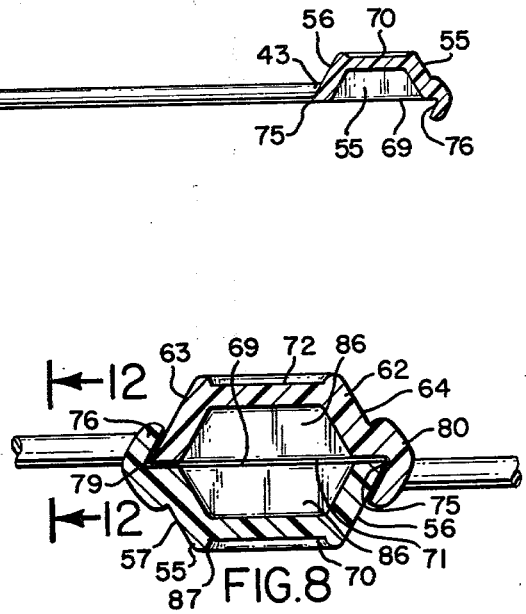
FIG. 8 is an enlarged partial vertical sectional view of the carrier of the instant invention taken along the line 8—8 of FIG. 3.
Figure 9:
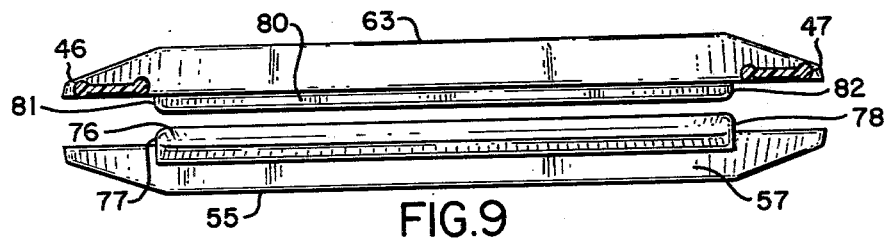
FIG. 9 is an enlarged vertical sectional view taken along the line 9—9 of FIG. 7 and particularly illustrating a preferred handle structure useful in connection with the carrier of the instant invention.
Figure 10:
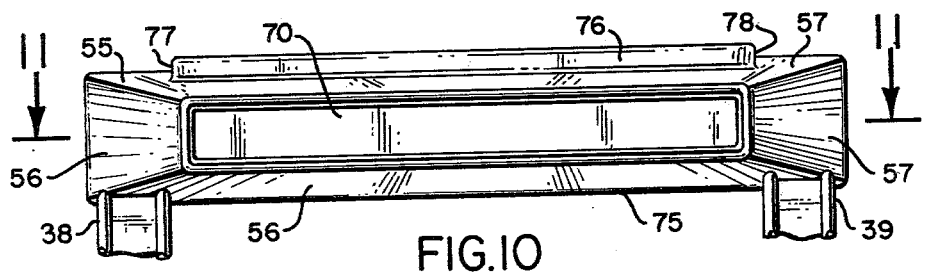
FIG. 10 is a plan view of the handle structure as illustrated in FIG. 9.

Referring now to FIGS. 8, 9, and 10, it is seen that bottom surface 69 and inboard side 56 of handle member 55 meet to form a generally V-shaped edge 75 extending between straps 38 and 39. While various means of forming a generally V-shaped edge will readily occur to those skilled in the art, it is generally preferred that side 56 extends inwardly of handle element 55 forming an acute angle with bottom surface 69. A lip 76 is carried alongside 57 of handle element 55. Lip 76 is directed inwardly over bottom surface 69. Lip 76 has a length which is receivable between strap members 46 and 47 and terminates with first shouldered end 77 and second shouldered end 78.

Similar to handle element 55, complementary handle element 62 has a generally V-shaped edge 79 formed along the junction of bottom surface 71 and side 63 and extending between strap members 46 and 47. Lip 80 extends along side 64 and is directed inwardly over top surface 63. Lip 80 terminates with first shouldered end 81 and second shouldered end 82 and has a length which is sized to be received between strap members 38 and 39.

It is contemplated that various materials can be used for the fabrication of carrier 30. Satisfactory results are obtained by unitary molding or forming from a plastic material which is inherently resiliently flexible and yeildable. Such materials include various polymers and co-polymers as will readily occur to those skilled in the fabrication of plastic articles.

Figure 11:
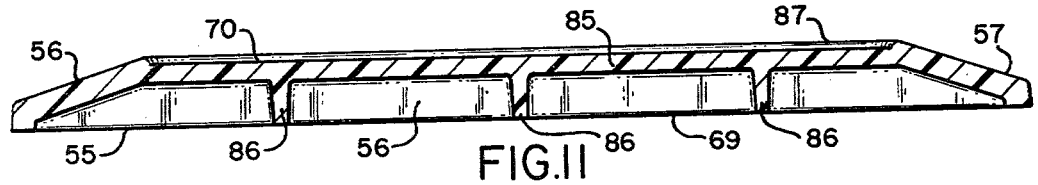
FIG. 11 is an enlarged vertical sectional view taken along the line 11—11 of FIG. 10.

Although formed of a flexible material, it is desired that the handle structure be relatively rigid. Rigidity is imparted to handle element 55 by the constructural configuration as seen in FIG. 11, which is also common to complementary handle element 62. Sides 56 and 57 and ends 58 and 59 are panels which converge upwardly to top surface 70 which is carried by top panel 85. Gussets 86 are integrally formed with top panel 85 and side panels 56 and 57. Further reinforcement is had by reinforcing bead 87 extending around top surface 70. The angular disposition of lip 76 adds even further rigidity.

Figure 12:
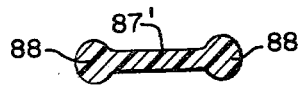
FIG. 12 is a vertical sectional view of a preferred strap means taken along the line 12—12 of FIG. 8.

The yieldability of endless member 31 is limited by the substantial cross section. Straps, 38, 39, 46 and 47 are readily bendable between the positions illustrated in FIGS. 5 and 7. Bending of the several strap members within the unstressed plane as seen in FIG. 5 is restricted by fabricating the several straps with a cross section as seen in FIG. 12. Each strap 38, 39, 46 and 47 has a relatively thin flat elongate central section 87 bounded along either side by generally cylindrical reinforcing beads 88. The cross section of reinforcing beads 88 is substantially less than the cross section of endless member 31.

A pair of retention tabs 89 extend inwardly from endless member 31, one tab being carried by transverse run 34 and the other tab being carried by transverse run 35. During assembly of carrier 30 with container 20 endless member 31 is urged upwardly around side walls 21 to abut under surface 27 of peripheral flange 26. During this motion, tabs 89 are deflected downwardly and frictionally engaged against side walls 21 in response to the resilient deformation of endless member 31. Subsequently, endless member 31 is retained in position and prevented from inadvertent disengagement.

Figure 7:
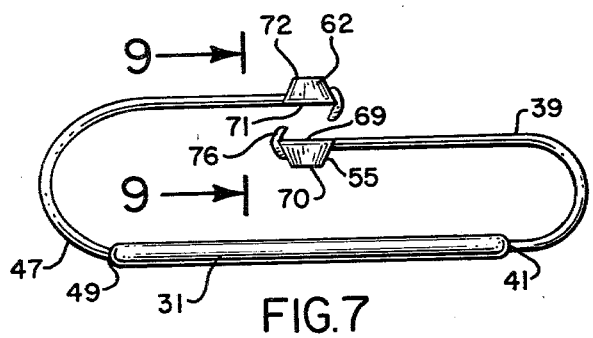
FIG. 7 is a view generally corresponding to the view of FIG. 5 and showing the carrier thereof in a partially stressed position.

With endless member 31 engaged with container 20, carrier 30 assumes an unstressed position substantially as illustrated in FIGS. 4 and 5. Closure member 23 is readily removed and replaced and convenient access is had to the interior of container 20. In preparation for the carrying arrangement of carrier 30, strap members 38 and 39 and 46 and 47 are lifted upwardly and inwardly, being deformed as illustrated in FIG. 7. Complementary handle element 62 is passed above and slightly beyond handle element 55. Bottom surface 69 of handle element 55 and top surface 71 of complementary handle element 73 are brought together. This can be readily accomplished as the user holds handle element 55 and complementary handle element 63 between the thumb and the forefinger of a hand. At the relaxation of manual pressure, the resilient strap members 38 and 39 and 46 and 47 will attempt to resume the unstressed position. Subsequently, edge 75 is urged into engagement with lip 80 and concurrently, edge 79 is urged into engagement with lip 80. Surfaces 69 and 71 are in juxtaposition and the handle structure is completed.

It will be appreciated that the elongate rigid handle structure is conveniently held by the user and provides a hand grip of sufficient dimension to stabalize non-uniform loads within container 20. Further stability is gained by the four strap members 38, 39, 46 and 47 which are spaced about endless member 31. Shifting of handle element 55 relative complementary handle element 62 is limited by the abutment of shouldered end 77 of lip 76 against strap member 46 and the abutment of shouldered end 78 against strap member 47. Similarly, lip 80 is retained between strap members 38 and 39 by shouldered ends 81 and 82 respectively. Release of the engagement as described above is simply affected, again as by forefinger and thumb pressure, the handle element and the complementary handle element diagonally apart. Thereafter, the resiliency of the strap members will tend to return carrier 30 to the unstressed position. Thus, ready access to container 20 is made available unobstructed by carrier 30 or the necessity of removing carrier 30.

Various changes and modifications in the device herein chosen for purposes of illustration will readily occur to those skilled in the art. For example, while each of the elements has been shown as having a preferred workable cross-section, other cross-sections providing compatible results are anticipated. Similarly, the edge and lip engagement means as described have equivalents amoung other male-female connnections. In view of the teachings of the present invention, it will occur to devise various containers to provide tote kits for specific purposes. To the extent that such modifications and variations do not depart from the spirit of the invention, they are intended to be included within the scope thereof which is limited only by a fair interpretation of the appended claims.

Having fully described and disclosed the present invention in such clear and concise terms as to enable those skilled in the art to understand and practice the same, the invention claimed is:

1. A tote kit for containing items and for storing and carrying said items, said tote kit comprising:
    (a) a container having substantially upright side walls, a bottom, and an open top; and closure member detachably engageable therewith;
    (b) a peripheral flange extending outward from said container and having an under surface;
    (c) an endless member encircling said container and restrained from upward movement by the under surface of said peripheral flange;
    (d) first flexible strap means extending from said endless member and having an end;
    (e) second flexible strap means extending from said endless member and opposed to said first flexible strap means and having an end;

(f) first and second connection means carried proximate the ends of said respective first and second flexible strap means; and (g) first and second connection receiving means carried by but spaced from the ends of said first and second flexible strap means and positioned juxtaposed said respective first and second connection means so as to be detachably engageable with said first and second connection means.

2. The tote kit of claim 1, wherein:
(a) said first and second connection means include:
  i. substantially rigid first and second elongate members extending transverse of said first and second flexible strap means, and
  ii. edges extending along said first and second elongate members and directed towards said respective first and second flexible strap means; and
(b) said first and second connection receiving means include, i. lips extending along said first and second elongate members substantially parallel with said edges and detachably engageable therewith.

3. The tote kit of claim 2, wherein at least one of said first and second flexible strap means is resiliently biased in a direction away from the other of said flexible strap means to urge said edges into engagement with said lips.

4. The tote kit of claim 2, wherein:
(a) said first flexible strap means includes a first pair of elongate strap members extending from spaced positions along said endless members and having respective ends adjoining said first elongate member at spaced apart positions proximate said edge thereof; and
(b) said second flexible strap means includes a second pair of elongate strap members extending from spaced positions along said endless member and having respective ends adjoining said second elongate member at spaced apart positions proximate said edge thereof.

5. The tote kit of claim 4, wherein:
(a) the respective ends of said first pair of elongate strap members are spaced apart along said first elongate member a sufficient distance to receive said first mentioned lip therebetween; and
(b) the respective ends of said second pair of elongate strap members are spaced apart along said second elongate member a sufficient distance to receive said second lip therebetween.

6. A carrier for use in combination with a container, which container includes a side wall, a top, a bottom and an outwardly directed peripheral flange, and for engaging and lifting said container, said carrier comprising:
(a) an endless member sized and shaped to encircle said container below said peripheral flange;
(b) first flexible strap means extending from said endless member and having an end;
(c) second flexible strap means extending from said endless member at a position opposed to said first flexible strap means and having an end;
(d) first and second connection means carried proximate the ends of said respective first and second flexible strap means; and
(e) first and second connection receiving means carried by but spaced from the ends of said first and second flexible strap means and detachably engageable with said first and second connection means.

7. The carrier of claim 6, wherein:
(a) said first and second connection means include:
  i. substantially rigid first and second elongate members extending transverse of said first and second flexible strap means; and
  ii. edges extending along said first and second elongate members and directed towards said respective first and second flexible strap means; and
(b) said first and second connection receiving means include:
  i. lips extending along said first and second elongate members substantially parallel with said edges engageable therewith.

8. The carrier of claim 7, wherein at least one of said first and second flexible strap means is resiliently biased in a direction away from the other of said flexible strap means to urge said edges into engagement with said lips.

9. The carrier of claim 8, wherein:
(a) said first flexible strap means includes a first pair of elongate strap members extending from spaced positions along said endless members and having respective ends adjoining said first elongate member at spaced apart positions proximate said edge thereof; and
(b) said second flexible strap means includes a second pair of elongate strap members extending from spaced positions along said endless member and having respective ends adjoining said second elongate member at spaced apart positions proximate said edge thereof.

10. The carrier of claim 9, wherein:
(a) the respective ends of said first pair of elongate strap members are spaced apart along said first elongate member a sufficient distance to receive said first mentioned lip therebetween; and
(b) the respective ends of said second pair of elongate strap members are spaced apart along said second elongate member a sufficient distance to receive said second lip therebetween.

11. The carrier of claim 10, wherein said carrier is substantially located in a single plane when in unstressed condition.

12. The carrier of claim 6, wherein said endless member is resiliently deformable.

* * * * *